(No Model.) 4 Sheets—Sheet 1.
C. F. BURKHARDT.
BICYCLE STAND.
No. 603,422. Patented May 3, 1898.
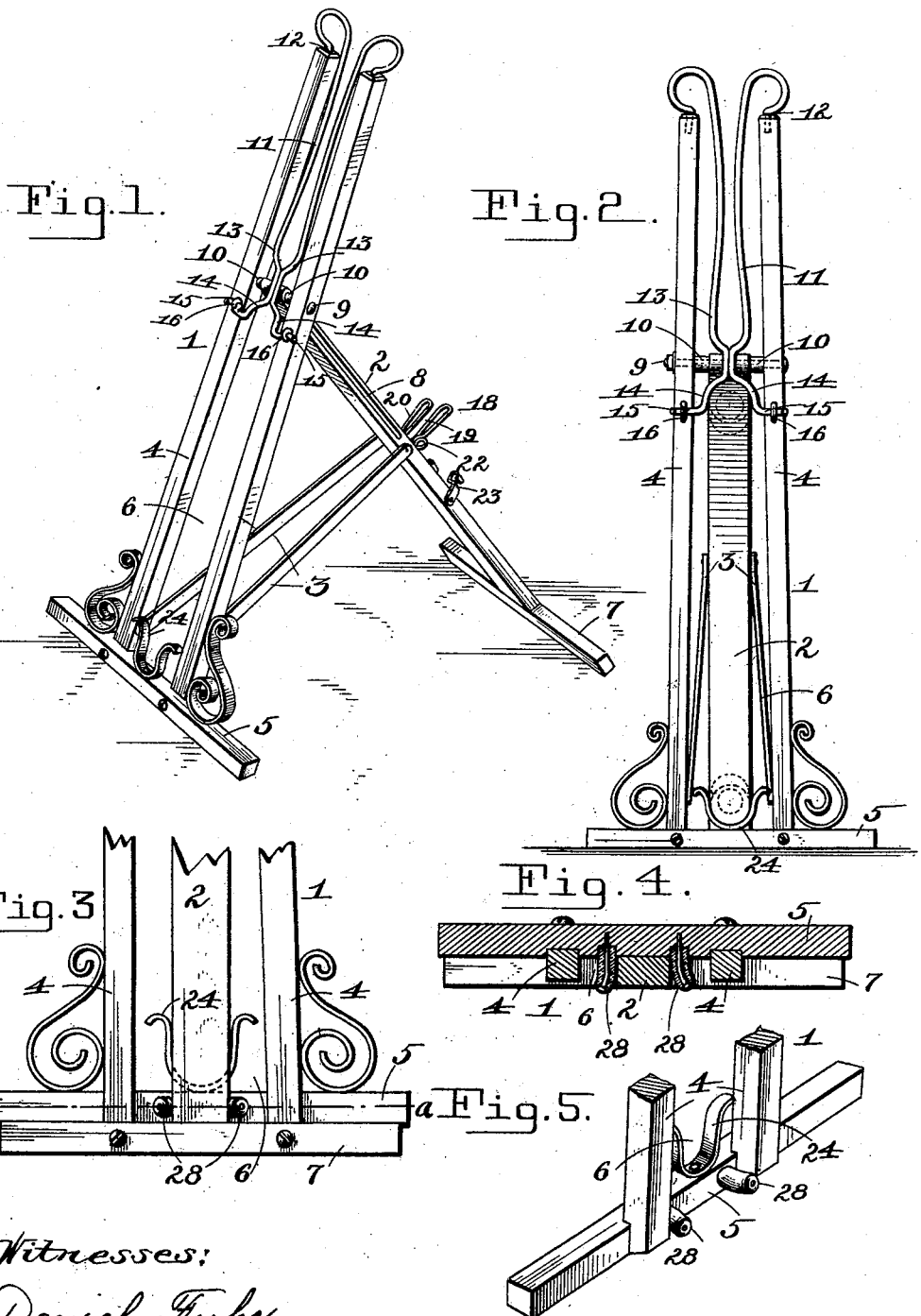
Witnesses:
Daniel Fuhr.
Frank Hoffmann.
Chas. F. Burkhardt,
Inventor.

(No Model.) 4 Sheets—Sheet 2.
C. F. BURKHARDT.
BICYCLE STAND.
No. 603,422. Patented May 3, 1898.
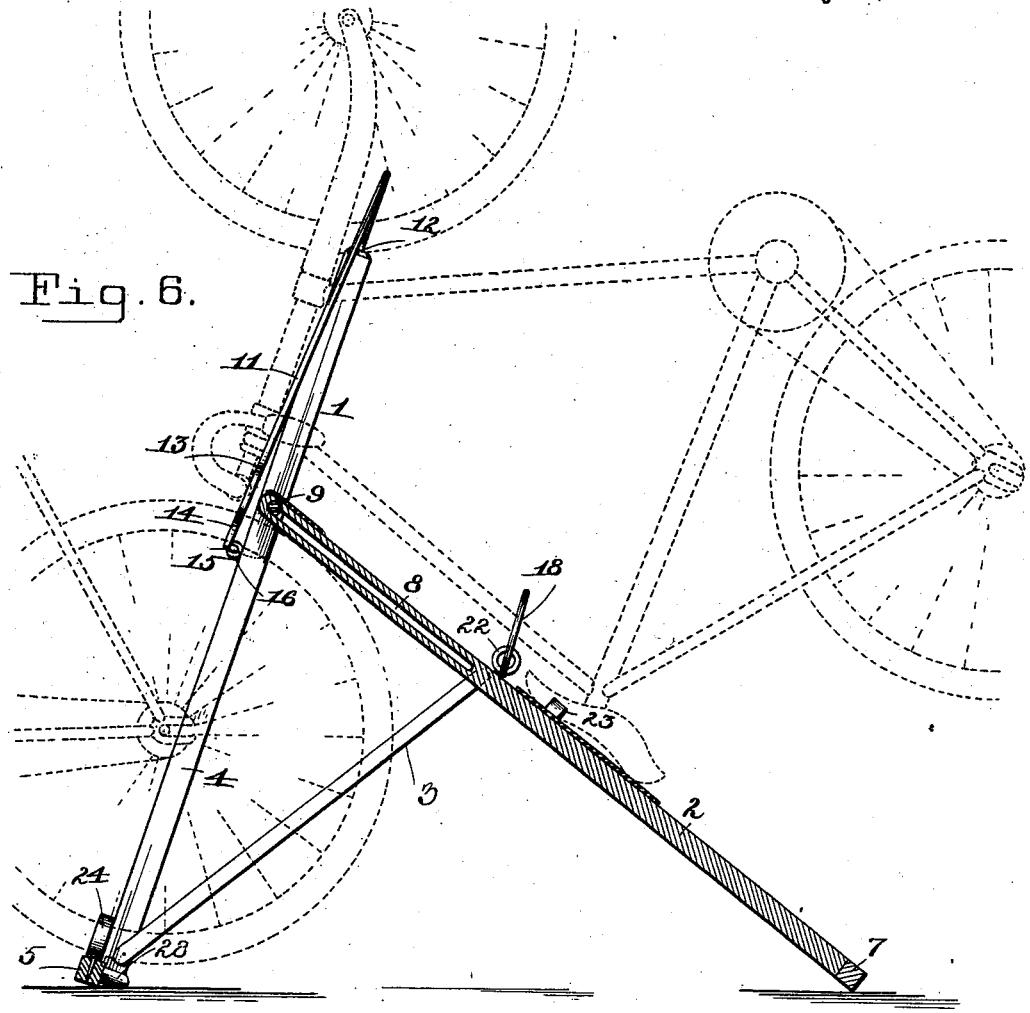
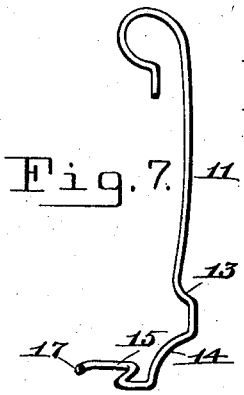
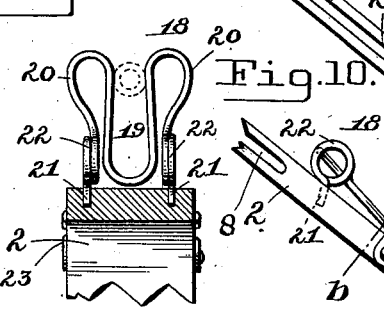
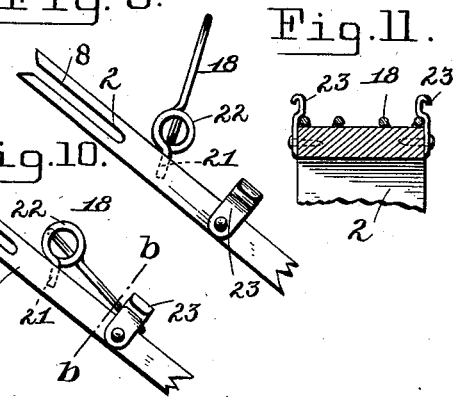
Witnesses. Daniel Fuhr, Frank Hoffmann
Inventor. Chas. F. Burkhardt (No Model.) 4 Sheets—Sheet 3.

C. F. BURKHARDT.
BICYCLE STAND.

No. 603,422. Patented May 3, 1898.

Witnesses.
Chas. F. Burkhardt,
Inventor.

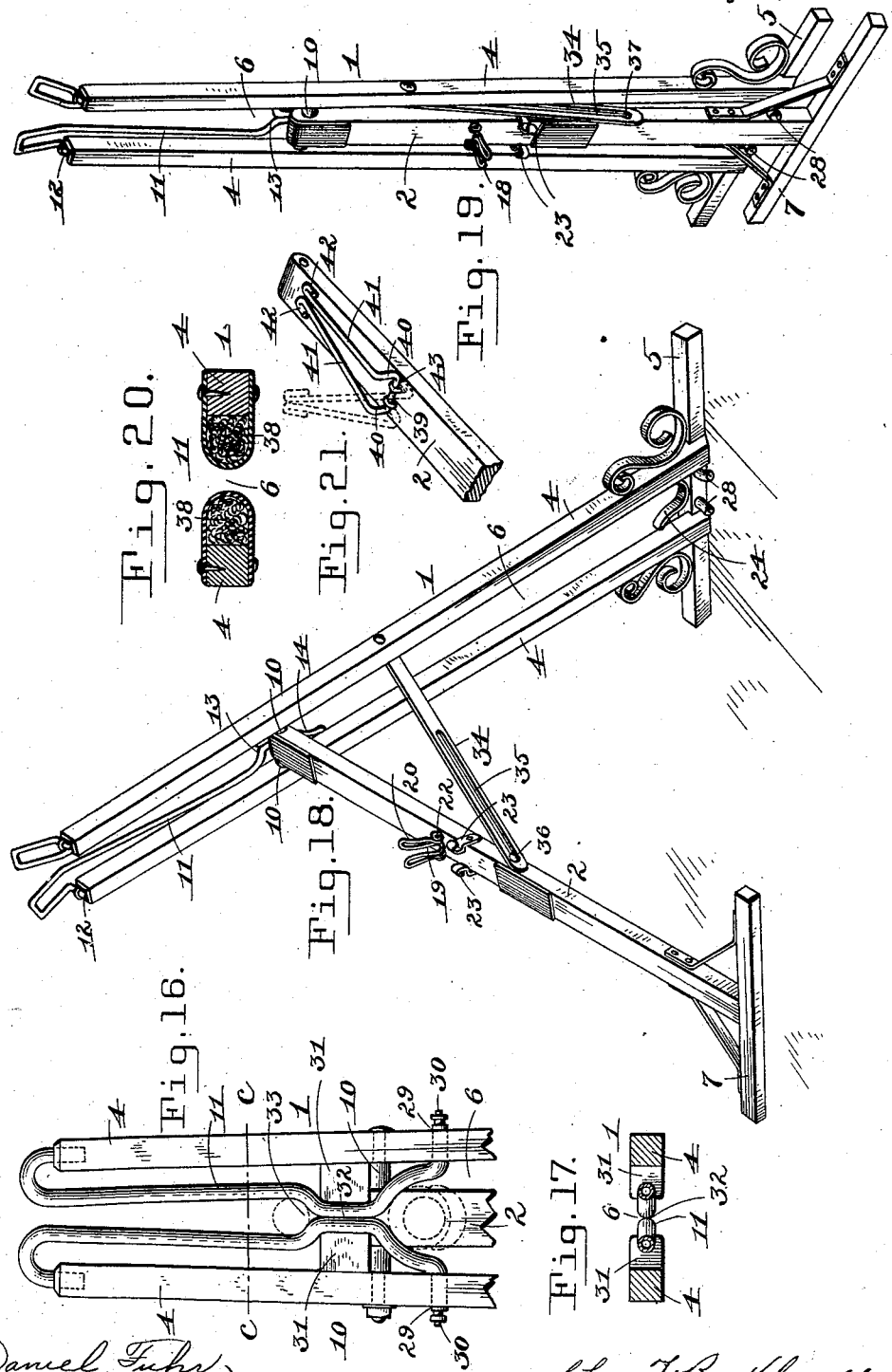

UNITED STATES PATENT OFFICE.

CHARLES F. BURKHARDT, OF BUFFALO, NEW YORK.

BICYCLE-STAND.

SPECIFICATION forming part of Letters Patent No. 603,422, dated May 3, 1898.

Application filed June 29, 1897. Serial No. 642,785. (No model.)

*To all whom it may concern:*

Be it known that I, CHARLES F. BURKHARDT, a citizen of the United States, residing at Buffalo, in the county of Erie and State of New York, have invented certain new and useful Improvements in Bicycle-Stands, of which the following is a specification.

This invention relates to stands designed for supporting bicycles above the ground in an inverted position, thereby allowing all revolving parts to be operated and admitting of access to all parts of the machine, it being also designed to retain and support bicycles in their upright or normal positions for storage or display.

The object of this invention is to provide a simple, inexpensive, and reliable stand whereby bicycles having frames formed of small or large tubes can be securely clamped and held in their normal position for storage or display or in an inverted position which admits of operating all movable parts and in which position the bicycle can be easily cleaned, lubricated, or repaired, the clamping of the frame being done by means of clamping devices which adjust themselves to the size of the tubes forming the frame of the machine, also other details of construction, as will hereinafter appear, and be pointed out in the claims.

Figure 12:
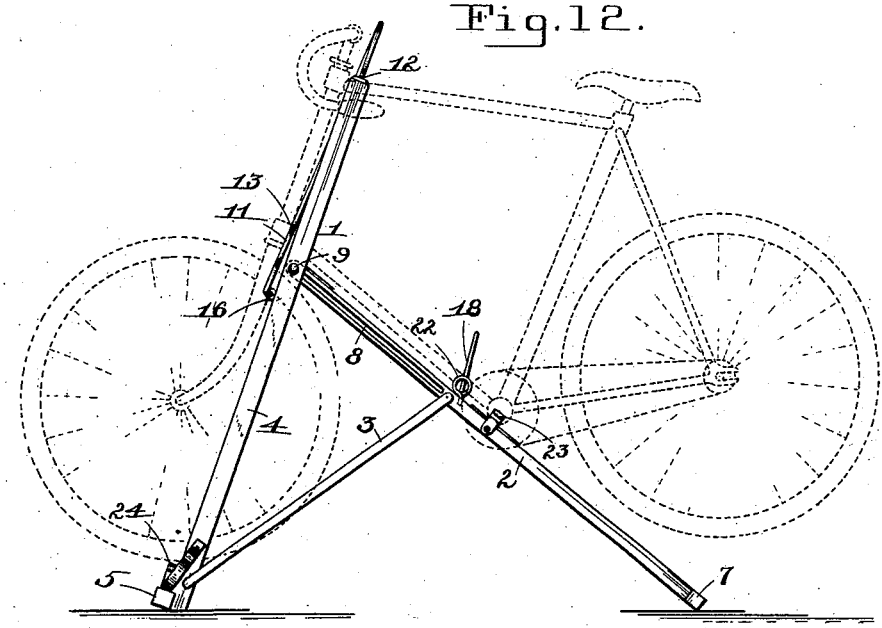
Figure 13:
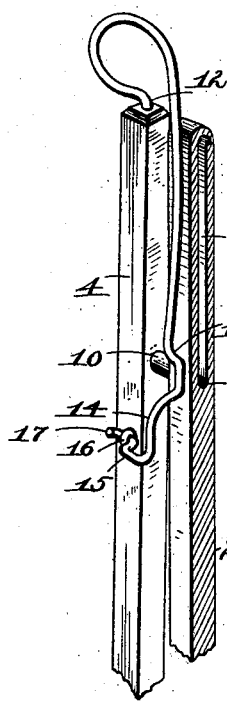
Figure 14:
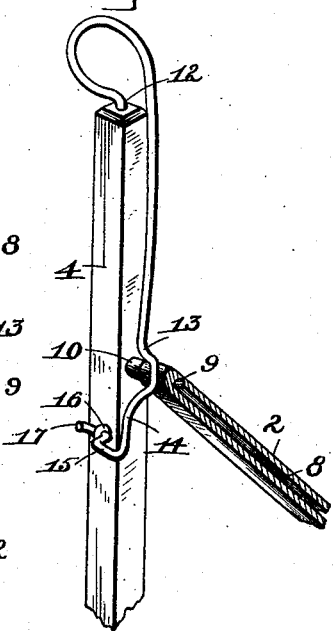
Figure 15:
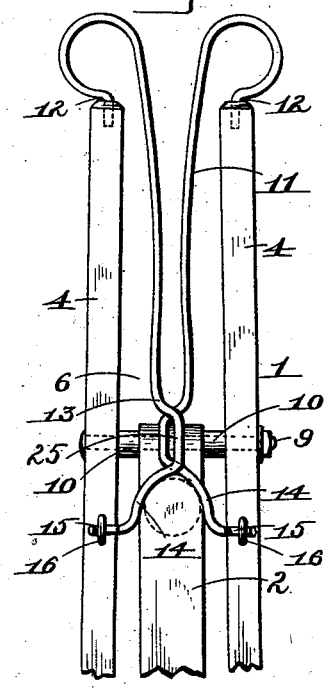

In the accompanying drawings, consisting of four sheets, Figure 1 is a perspective view of my improved stand in position for supporting or retaining a bicycle. Fig. 2 is a front elevation of the same. Fig. 3 is a rear view of the lower portion of the stand folded, showing the manner of holding the same in position. Fig. 4 is a horizontal section on line $a$ $a$, Fig. 3. Fig. 5 is a perspective view of the lower portion of the main frame or upright. Fig. 6 is a sectional elevation of the stand unfolded, showing the rear wheel of a bicycle in dotted lines supported in the lower portion of the main frame and a second bicycle in dotted lines inverted on the same. Fig. 7 is a detached perspective view of one-half of the clamping device which is attached to the upper part of the bifurcated upright. Fig. 8 is a front view of the clamping device attached to the brace. Fig. 9 is a side view of the same and its locking-catches. Fig. 10 is a similar view showing the clamping device held in its folded position by the locking-catches. Fig. 11 is a section on line $b$ $b$, Fig. 10. Fig. 12 is a side elevation of the stand, showing a bicycle in dotted lines in its upright or normal position for storage or display. Fig. 13 is an enlarged sectional perspective view of the upper portion of the main frame and brace, the same being shown in its folded position. Fig. 14 is a similar view in its unfolded position. Fig. 15 is a front elevation of the upper part of the stand, showing the clamping device in a position for use in clamping or supporting bicycles with small tires. Fig. 16 is a front elevation of the upper part of a stand having a modified form of clamping device. Fig. 17 is a horizontal section through the bars which form the upright and the clamping device on line $c$ $c$, Fig. 16. Fig. 18 is a perspective view of a modified form of stand, the same being unfolded. Fig. 19 is a similar view showing the stand folded. Fig. 20 is a horizontal section of the bars forming the upright, showing a further modified form of clamping device. Fig. 21 is a perspective view of the upper part of the brace, showing a modified form of folding clamp secured thereto.

Like numerals of reference refer to like parts in the several figures.

The stand as shown consists of an upright or main frame 1, a folding brace 2 for supporting the same in proper position, and stays or links 3 for limiting the outward swinging movement of the brace. The upright or main frame is bifurcated for the purpose of allowing the frame of the bicycle to be placed and retained in its upper portion, also for receiving the driven or driving wheel of the bicycle and supporting the same in its lower portion. The upright or main frame consists of two upright bars 4, which preferably converge toward their upper ends. At their lower ends these bars are connected by a horizontal bar or base 5, which extends laterally a sufficient distance to form a rigid support and prevent the tipping of the upright.

By the arrangement of the bars as above described the space 6 between the same is larger at the bottom than at the top of the upright. The bar or base 5 is offset or set in advance of the bars 4 for the purpose of allowing the brace 2 to swing between the latter, thereby presenting an even surface when folded and admitting of folding the stand within a small compass. The brace 2 is provided at its lower end with a horizontal bar or base 7, adapted to form a solid support for the stand, and at its upper end with a longitudinal slot or way 8, through which a transverse bolt or pin 9 passes. This pin or bolt passes through the bars 4 and the longitudinal slot or way 8 and acts as a pivot on which the brace swings and slides. Filling pieces or washers 10 surround the bolt 9 and are located between the bars 4 and the brace, this being necessary to center the brace in the space between the bars of the upright and also to admit of swinging the links 3 in between the bars and the brace. These links or stays are pivotally secured to the inner sides of said bars and the outer sides of the brace. The brace is about the same length as the bars 4 of the upright and is adapted to fold between the same, as shown in Figs. 3, 4, and 13, the upper end thereof when folded being about even with the upper ends of the bars 4, while the base 7 of the brace sets directly below the base of the upright, as shown in Fig. 3.

A self-adjusting clamping or holding device 11 is located at the upper end of the upright or main frame 1. This clamping device is made of resilient wire or analogous material bent in the proper form and secured to the bars forming the upright. As shown in Figs. 1 to 15, both inclusive, these wires are secured at one of their ends in the upper ends of the bars 4, as at 12, then curved into a loop and downwardly between and slightly in advance of said bars. By this construction a flaring entrance is formed, thereby permitting the tubes forming the bicycle-frame to be readily placed between the wires forming the clamping device. This flaring entrance is of particular advantage when a wheel having a long steering-head or wheels having different lines are held in an inverted position on the stand. The crown of the forks in that case bears against the wires forming the clamping device and the wheel which passes down between the wires is permitted to revolve for cleaning or repairing the same, which would be impossible if the wires extended upwardly in a straight line. Inward bends or offsets 13 are formed on the wires at about two-thirds of their length, thereby bringing the same together to form a seat. At a short distance below this seat the wires are curved downwardly and outwardly, as at 14, to form a semicircular clamp, in which the tire of the wheel is clamped. Lateral extensions 15 are then formed, which pass through eyes 16, secured to the bars of the upright. The ends of the wires at this point are upset, as at 17, to prevent accidental disengagement from said eyes. This clamping device adjusts itself to the size of the tubes forming the frame of the machine and holds the same firmly in proper position, thereby avoiding the indenting of the frame caused by the stands heretofore constructed, which do not closely fit against the sides of the tubes, and which are therefore permitted to sway and strike the edge of the stand.

18 represents a clamping or holding device secured to the outer face of the brace and constructed to adjust itself to the size of the tube forming the bicycle-frame. This device is also formed of resilient wire or analogous material, and is provided at its center with a U-shaped portion 19, in which the upper or lower member of the bicycle-frame is held. This U-shaped portion is curved or bent down upon itself, as at 20, and extends down into the brace, as at 21, where it is securely seated. Before entering the brace the downwardly-bent portion 20 is coiled, as at 22, to permit the folding of the clamp, as shown in Fig. 10, where it is held by the locking-catches 23, which are secured to the sides of the brace. This clamp is made of sufficient length to hold and retain the upper member of a bicycle when inverted and supported on the stand for cleaning and the lower member thereof when held in its normal position, and also to prevent the bicycle from being forced over the edge of the brace.

The wires forming the clamping devices 11 and 18 are covered with felt or other suitable material to prevent injuring the enamel on the frame.

Secured to the base 5 is a U-shaped clamp 24, adapted to receive the tire of the wheel when placed between the bars forming the upright, as shown in Figs. 2 and 5.

When supporting the bicycle on the ground, the upper part of the wheel is clamped in the lower part of the clamping device 11, while the lower part of the wheel is securely held in the clamp 24, thereby firmly holding and supporting the bicycle between the bars 4 of the upright. In supporting a bicycle having a narrow tire in this position the wires forming the clamping device 11 are made to overlap, as at 25, thereby bringing the lower ends of the semicircular portion closer together and securely holding the tire, as shown in Fig. 15.

28 represents friction-posts or pieces which are set into the rear side of the base or horizontal bar secured to the upright. In folding the stand the brace is adapted to fold between these friction-pieces, which bear against the sides of the same and securely hold it in its closed position.

In supporting the bicycle in position for storage or display the rear part of the lower member of the frame is set into the clamp 18, with the crank-hanger resting on the brace, while that portion of the upper and lower members of the frame directly in rear of the steering-head is passed down between the bars of the upright, where it is securely held by the clamping device 11, and the upper part of the rear wheel is held in the lower clamp of said clamping device for the purpose of keeping the front wheel in line with the rear wheel. The clamping of the front wheel in the lower clamp of the clamping device 11 also prevents the bicycle from slipping down the brace.

In supporting the bicycle in the inverted position the saddle rests on the brace. The upper member of the frame is held in the clamp 18. The upper and lower members of the frame directly in rear of the steering-head pass down between the bars of the upright, where they are held by the clamping device 11, the front wheel being held in line with the rear wheel by the handle-bars bearing against the bars of the upright or the wires forming the clamping device 11.

In Figs. 16 and 17 is shown a modification of the self-adjusting clamping device which is secured to the upper portion of the upright. In this case pneumatic tubes are used in place of wires, one end of the tubes being secured in the upper end of the bars 4, forming the upright, while the other end thereof passes through the bars, as at 29, where they are supplied with air-valves 30. Filling-blocks 31 are secured to the inner faces of the bars 4 for the purpose of bringing the tubes together, as at 32, to form a seat 33. This construction also admits of retaining bicycles having frames of different sizes, the clamp adjusting itself to the tubes and securely holding the same.

In Figs. 18 and 19 a stand having a brace pivotally, but not slidingly, connected to the upright is shown. In this construction the link 34 is provided with a longitudinal slot or way 35, through which a pin 36 passes. In its unfolded position the pin bears against the lower end of the slot, where it is offset, as at 37, and in its folded position it bears against the upper end of the same.

In Fig. 20 a still further modified form of clamping or holding device is shown, the inner sides of the bars being cushioned, as at 38. The cushions in this case act the same as the flexible wire clamps above described. In passing a bicycle-frame down between the cushions they are forced back or compressed and firmly hold the frame in the desired position. After removing the bicycle the cushions will expand to their normal position, as shown in the drawings.

A modified form of the folding clamping device secured to the brace is shown in Fig. 21, the clamp being shown with a central portion 39, which extends from side to side of the brace 3, the same being bent laterally, as at 40, then upwardly, as at 41. The outer ends of these upwardly-bent portions are bent back upon themselves, as at 42, to form a flaring end to facilitate the introduction of the tube. 43 are staples which secure the clamp to the brace. In its folded position the clamp bears with its outer end upon the brace, and in its upright or unfolded position the lateral extensions 40 bear against the brace, as shown in dotted lines.

Having thus described my invention, what I claim is—

1. A bicycle-stand, consisting of an upright or main frame, a brace for supporting the same, and a flexible or self-adjusting clamping device secured to or near the upper end of said upright, said clamping device passing down upon the same some distance from its upper end so as to embrace or clamp the upper and lower members of the bicycle-frame, substantially as set forth.

2. A bicycle-stand, consisting of an upright or main frame, a folding brace having a combined sliding and swinging movement attached thereto, stays or links connecting the brace and the upright, a self-adjusting clamping device secured to the upper portion of said upright, and a self-adjusting clamp secured to the outer face of the brace, substantially as set forth.

3. A bicycle-stand, consisting of an upright or main frame, a brace for supporting the same, and a self-adjusting clamping device secured to the upper portion of said upright, said clamping device having a clamping portion at its upper end to retain or hold the frame of the bicycle and a clamping portion at its lower end to clamp the tire of the wheel, substantially as set forth.

4. A bicycle-stand, consisting of an upright or main frame, a brace for supporting the same, and a self-adjusting clamping device formed of two pieces of resilient wire, the upper ends of said wires being secured to or near the upper end of the upright, then bent or curved downwardly and offset or bent to contact and form a seat, said contacting portions being bent downwardly and outwardly and secured to the upright, substantially as set forth.

5. A bicycle-stand, consisting of an upright or main frame, a brace for supporting the same, and a flexible or self-adjusting clamping device secured to or near the upper end of said upright, said clamping device having a flaring entrance and passing down upon the upright some distance from its upper end so as to embrace or clamp the upper and lower members of the bicycle-frame, substantially as set forth.

6. A bicycle-stand, consisting of an upright or main frame, a brace for supporting the same, and a clamping device secured to the brace to embrace the upper or lower member of the bicycle-frame, said clamping device being formed of resilient wire and having a central portion 39, laterally-bent portions 40, and upwardly-bent portions 41, said upwardly-bent portions having a flaring entrance, substantially as set forth.

7. A bicycle-stand, consisting of an upright or main frame composed of a base and a pair of upright bars separated by an intervening space, said base being offset or set in advance of said bars, a folding brace or support having a combined sliding and swinging movement and a base or horizontal bar at its outer end, and a link or stay connecting said brace with the upright, substantially as set forth.

CHARLES F. BURKHARDT.

Witnesses:
 DANIEL FUHR,
 FRANK HOFFMANN.